US008382570B2

(12) United States Patent
Bennett

(10) Patent No.: US 8,382,570 B2
(45) Date of Patent: Feb. 26, 2013

(54) GAMING APPARATUS WITH SPECIAL SYMBOLS

(75) Inventor: Nicholas Luke Bennett, Manly Vale (AU)

(73) Assignee: Aristocrat Technologies Australia Pty Ltd (AU)

( * ) Notice: Subject to any disclaimer, the term of this patent is extended or adjusted under 35 U.S.C. 154(b) by 1523 days.

(21) Appl. No.: 11/828,735

(22) Filed: Jul. 26, 2007

(65) Prior Publication Data

US 2008/0064465 A1 Mar. 13, 2008

(30) Foreign Application Priority Data

Jul. 26, 2006 (AU) ................................ 2006904035

(51) Int. Cl.
*A63F 13/00* (2006.01)
*A63F 9/24* (2006.01)
*A63F 1/00* (2006.01)

(52) U.S. Cl. ............................................ 463/20; 463/16

(58) Field of Classification Search .................... 463/16, 463/20

See application file for complete search history.

(56) References Cited

U.S. PATENT DOCUMENTS

| | | | | |
|---|---|---|---|---|
| 7,070,502 | B1 * | 7/2006 | Bussick et al. | 463/20 |
| 2003/0054874 | A1 * | 3/2003 | Kaminkow | 463/20 |
| 2003/0060267 | A1 * | 3/2003 | Glavich et al. | 463/20 |
| 2003/0153382 | A1 * | 8/2003 | Vancura | 463/20 |
| 2003/0203752 | A1 | 10/2003 | Kaminkow et al. | |
| 2004/0048650 | A1 * | 3/2004 | Mierau et al. | 463/20 |
| 2004/0097280 | A1 * | 5/2004 | Gauselmann | 463/16 |
| 2005/0014557 | A1 * | 1/2005 | Duhamel | 463/20 |
| 2005/0049035 | A1 * | 3/2005 | Baerlocher et al. | 463/20 |
| 2005/0054418 | A1 * | 3/2005 | Baerlocher | 463/20 |
| 2005/0070354 | A1 * | 3/2005 | Baerlocher et al. | 463/20 |
| 2005/0130731 | A1 * | 6/2005 | Englman et al. | 463/20 |
| 2005/0148384 | A1 * | 7/2005 | Marks et al. | 463/20 |
| 2006/0068881 | A1 | 3/2006 | Casey | |
| 2006/0172795 | A1 * | 8/2006 | Bussick et al. | 463/20 |
| 2006/0281525 | A1 * | 12/2006 | Borissov | 463/20 |

FOREIGN PATENT DOCUMENTS

| | | |
|---|---|---|
| EP | 1296296 | 3/2003 |
| EP | 1519333 | 3/2005 |

* cited by examiner

*Primary Examiner* — Melba Bumgarner
*Assistant Examiner* — Frank M Leiva
(74) *Attorney, Agent, or Firm* — McAndrews, Held & Malloy, Ltd.

(57) ABSTRACT

Systems and methods for determining a plurality of outcomes of a game of chance are provided. In a spinning reel game, for example, a first game event may be provided in which a plurality of symbols are spun up on a plurality of spinning reels to form an array of symbols, each spinning reel spinning up at least three symbols and at least one of the spinning reels being defined so that at least two feature symbols can be simultaneously spun up on that reel. A result of the spin is evaluated to assess whether two or more feature symbols have been spun up on the same reel. If so, a second game event is provided in which the two or more feature symbols and all other symbols spun up on the same reel are converted to special symbols. The special symbols have an enhanced play characteristic in comparison to the other symbols, and the outcome of the game is re-evaluated to establish whether any outcomes exist which define a winning combination. A prize or an award is awarded if one or more winning combinations exist.

13 Claims, 7 Drawing Sheets

GAMING APPARATUS WITH SPECIAL SYMBOLS

CROSS REFERENCE TO RELATED APPLICATIONS

This application claims priority to Australian Patent Application No. AU2006904035, having an international filing date of Jul. 26, 2006, entitled "Gaming Apparatus with Special Symbols", which is hereby incorporated by reference herein in its entirety.

FIELD OF THE INVENTION

The present invention relates to gaming apparatus and methods of gaming. A particular embodiment of the present invention relates to a game playable on a gaming apparatus that has one or more special symbols that provide enhanced play characteristics.

BACKGROUND OF THE INVENTION

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming apparatus that are allowable, both in terms of the prevailing regulations and in terms of providing a return on investment to the gaming venue operators.

In addition, it is important that a player be able to understand the operation of a game quickly so that the player can start to quickly play the game and therefore extract maximum entertainment from the game.

Some games offered on gaming machines are spinning reel games, in which one the symbols on one or more reels is a special symbol. An example of a special symbol is a WILD symbol, which is a symbol that substitutes for other symbols to potentially form a winning outcome in the game. After the reels have been spun, the symbols are evaluated for one or more winning combinations of symbols. If a WILD symbol appears in a location that is evaluated for a winning combination, then it can substitute for other symbols in order to form a winning combination. Accordingly, the appearance of one or more WILD symbols is important to a player of the gaming machine, as it is more likely a win will occur.

Games with WILD symbols or other special symbols may have an increased attraction to players. It is therefore important that new games incorporating WILD symbols are developed and that they are provided to the player in an effective manner.

SUMMARY OF THE INVENTION

According to a first aspect of the present invention there is provided a method for use with a gaming machine that is arranged to present a plurality of symbols to a person, the method comprising the steps of:

determining whether the symbols comprise at least one feature symbol;

determining whether a game criterion has been satisfied; and replacing each feature symbol with a special symbol subsequent to determining that the game criterion has been satisfied.

In one embodiment, method comprises replacing the feature symbols with special symbols when the symbols comprise a threshold number of feature symbols, the threshold number being at least two.

In another embodiment, the method comprises replacing the feature symbols with special symbols when the symbols comprise two or more feature symbols in a predetermined relationship.

According to a second aspect of the present invention, there is provided a method of determining a plurality of outcomes of a spinning reel game played on a computational gaming apparatus, the method comprising:

providing a first game event in which a plurality of symbols are spun up on a plurality of spinning reels to form an array of symbols, each spinning reel spinning up at least three symbols and at least one of the spinning reels being defined so that at least two feature symbols can be simultaneously spun up on their respective reel;

evaluating whether two or more said feature symbols have been spun up on the same reel and if so providing a second game event in which the two or more feature symbols and all other the symbols spun up on the same reel are converted to special symbols, wherein a special symbol has an enhanced play characteristic in comparison to others of said plurality symbols;

defining a plurality of outcomes through the symbols resulting from the second game event and evaluating the outcomes for a winning combination and awarding an award if one or more winning combinations exists; and displaying on a display, or causing a display to display, representations of the first game event and the second game event.

In certain embodiments, each spinning reel that is defined so that at least two feature symbols can be simultaneously spun up has adjacent feature symbols, and the step of converting the other symbols spun up on the same reel to special symbols comprises moving the spinning reel so that at least one other symbol is moved out of the array and a feature symbol is moved into the array, and then converting the feature symbols into special symbols. In certain embodiments, the step of moving the spinning reel is only completed if there is only one symbol that has been spun up on a reel that is not a feature symbol.

According to a third aspect of the present invention, there is provided a method of determining a plurality of outcomes of a spinning reel game played on a computational gaming apparatus, the method comprising:

providing a first game event in which a plurality of symbols are spun up on a plurality of spinning reels to form an array of symbols, each spinning reel spinning up at least three symbols and at least one of the spinning reels being defined so that at least two feature symbols can be simultaneously spun up on their respective reel;

evaluating whether two or more said feature symbols have been spun up on the same reel and if so providing a second game event in which the two or more feature symbols and all other symbols spun up on the same reel between two instances of the or more feature symbols are converted to special symbols, wherein a special symbol has an enhanced play characteristic in comparison to others of said plurality symbols;

defining a plurality of outcomes through the symbols resulting from the second game event and evaluating the combination of the special symbols and other symbols for a winning combination and if a winning combination exists, awarding an award; and displaying on a display, or causing a display to display, representations of the first game event and the second game event.

According to a fourth aspect of the present invention, there is provided a method of determining a plurality of outcomes of a game played on a computational gaming apparatus, the method comprising:

providing a first game event in which a plurality of symbols are selected to form an array of symbols having at least three columns;

evaluating whether two or more feature symbols have been selected in the same row and if so providing a second game event in which the two or more feature symbols and all other the symbols in the same row are converted to special symbols, wherein a special symbol has an enhanced play characteristic in comparison to others of said plurality symbols;

defining a plurality of outcomes through the symbols resulting from the second game event and evaluating the combination of the special symbols and other symbols for a winning combination and if a winning combination exists, awarding an award; and displaying on a display, or causing a display to display, representations of the first game event and the second game event.

According to a fifth aspect of the present invention, there is provided a method of determining a plurality of outcomes of a game played on a computational gaming apparatus, the method comprising:

providing a first game event in which a plurality of symbols are selected to form an array of symbols having at least three columns;

evaluating whether two or more said feature symbols have been selected for the same row and if so providing a second game event in which the two or more feature symbols and all other the symbols in the same row and located between two instances of feature symbols are converted to special symbols, wherein a special symbol has an enhanced play characteristic in comparison to others of said plurality symbols;

defining a plurality of outcomes through the symbols resulting from the second game event and evaluating the combination of the special symbols and other symbols for a winning combination and if a winning combination exists, awarding an award; and displaying on a display, or causing a display to display, representations of the first game event and the second game event.

In certain embodiments, the game is a spinning reel game, with each reel forming one of said columns and displaying a plurality of symbols to thereby define a plurality or rows, with at least two of the reels including at least one feature symbol.

According to a sixth aspect of the present invention, there is provided a method of determining a plurality of outcomes of a spinning reel game played on a computational gaming apparatus, the method comprising:

providing a first game event in which a plurality of symbols are spun up on at least three spinning reels to form an array of symbols having a plurality of rows, and at least two of the spinning reels including at least one feature symbol;

evaluating whether two or more said feature symbols have been spun up in the same row or evaluating whether two or more said feature symbols have been spun up in the same column, and if so providing a second game event in which the other symbols in the same row or column as the two or more feature symbols are converted to feature symbols and then converting the feature symbols into special symbols, wherein a special symbol has an enhanced play characteristic in comparison to others of said plurality symbols;

defining a plurality of outcomes through the symbols resulting from the second game event and evaluating the combination of the special symbols and other symbols for a winning combination and if a winning combination exists, awarding an award; and displaying on a display, or causing a display to display, representations of the first game event and the second game event.

According to a seventh aspect of the present invention, there is provided a method of determining a plurality of outcomes of a spinning reel game played on a computational gaming apparatus, the method comprising:

providing a base game in which a plurality of symbols are spun up on a plurality of spinning reels;

providing a feature game in which a plurality of symbols are spun up on a plurality of spinning reels, the feature game being triggered by a trigger event that occurs during play of the base game;

providing in the spinning reels of both the base game and the feature game feature symbols and other symbols, wherein if two or more feature symbols appear in the array in a predefined relationship, then the two or more feature symbols and at least one other symbol is converted to a special symbol having an enhanced play characteristic in comparison to the other symbols and then defining a plurality of outcomes through the spinning reels;

wherein the feature game has a higher average return to player than the base game and the higher return to player results from an increased chance of converting feature symbols and other symbols into special symbols.

According to an eighth aspect, the invention broadly resides in a method for use with a gaming machine that is arranged to present a plurality of symbols to a person in an array, the method comprising the steps of:

determining whether the symbols comprise at least two feature symbols in a predetermined relationship with each other;

determining whether a game criterion has been satisfied; and replacing the feature symbol with a special symbol subsequent to determining that the game criterion has been satisfied.

In certain embodiments, the method further comprises replacing one or more symbols other than a feature symbol with a special symbol. The one or more symbols other than a feature symbol may be determined based on having a certain location relative to the at least two feature symbols.

According to a ninth aspect, the invention broadly resides in a gaming apparatus operable to implement the method as described in any one of the preceding paragraphs.

In certain embodiments, the step of converting to special symbols comprises a first step in which the other symbols in the column or row are displayed as feature symbols and then the feature symbols are changed into special symbols.

In certain embodiments, the game is a spinning reel game that defines the outcomes by a plurality of pay lines that extend across the spinning reels.

In certain embodiments, the method further comprises determining a plurality of outcomes for a feature game, the feature game also comprising a spinning reel game having feature symbols that are convertible to special symbols when two or more feature symbols are spun up, wherein the feature game has a higher average return to player than the average return to player resulting from the first game event and second game event.

In certain embodiments, the special symbols provide sufficiently enhanced play characteristics so as to provide an increased payout regardless of which other symbol they replaced.

Further aspects of the present invention will become apparent from the following description, given by way of example only and with reference to the accompanying drawings.

BRIEF DESCRIPTION OF THE DRAWINGS

Notwithstanding any other embodiments that may fall within the scope of the present invention, certain embodiments of the present invention will now be described, by way of example only, with reference to the accompanying figures, in which.

DETAILED DESCRIPTION

Figure 1:
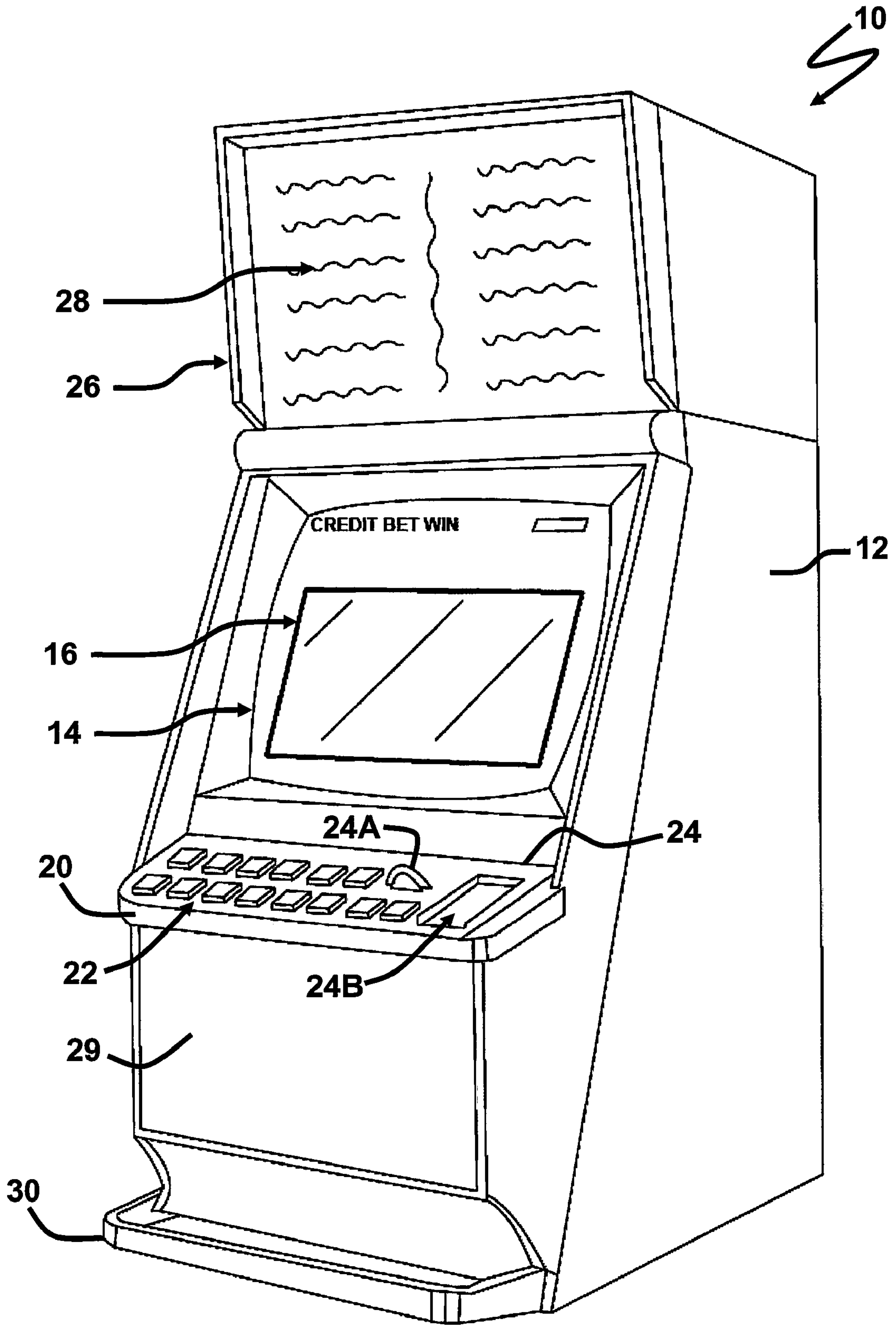
FIG. 1: shows diagrammatically, a view of a gaming machine suitable for implementing certain embodiments of the present invention.

In FIG. 1 of the accompanying drawings, one example of a gaming machine suitable for implementing certain embodiments of the present invention is generally referenced by arrow 10.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or a different type of display.

Figure 2:
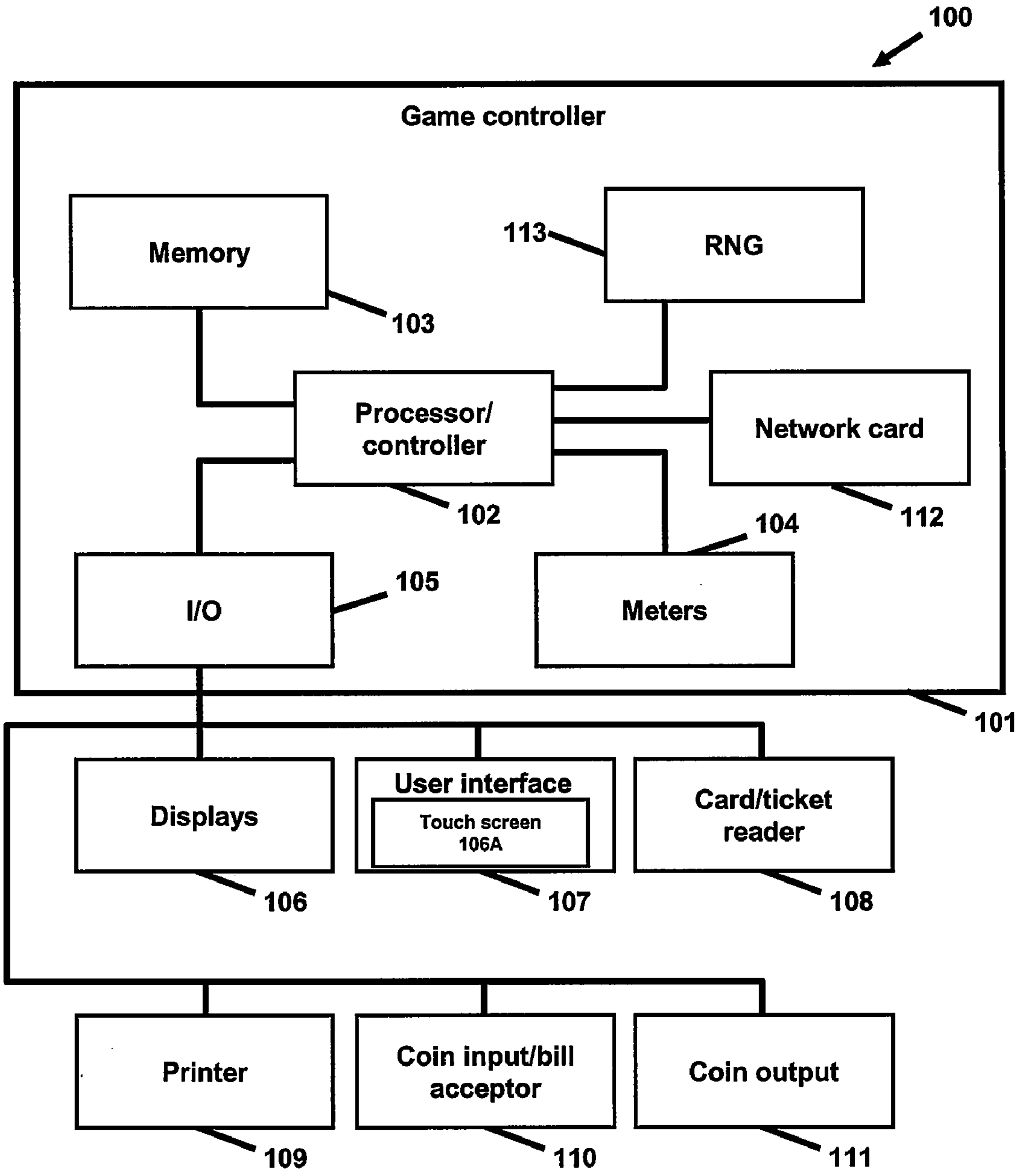
FIG. 2: shows a block diagram of gaming apparatus suitable for implementing certain embodiments of the present invention.

FIG. 2 shows a block diagram of a gaming apparatus, generally referenced by arrow 100, suitable for implementing certain embodiments of the present invention. The gaming apparatus 100 may, for example, operate as a standalone gaming machine of the type shown in FIG. 1. However, the gaming apparatus 100 may alternatively operate as a networked gaming machine, communicating with other network devices, such as one or more servers or other gaming machines. The gaming apparatus 100 may also have distributed hardware and software components that communicate with each other directly or through a network. Accordingly, different reference numerals have been used in FIG. 2 from FIG. 1 for components that may be equivalent.

The gaming apparatus 100 includes a game controller 101, which in the illustrated example includes a microprocessor, microcontroller, programmable logic device or other computational device 102. Instructions and data to control operation of the computational device 102 are stored in a memory 103, which is in data communication with the computational device 102. Typically, the gaming apparatus 100 will include both volatile and non-volatile memory and more than one of each type of memory, with such memories being collectively represented by the memory 103. The instructions to cause the game controller 101 to implement certain embodiments of the present invention will be stored in the memory 103.

The gaming apparatus may include hardware meters 104 for the purposes of regulatory compliance and also include an input/output (I/O) interface 105 for communicating with the peripheral devices of the gaming apparatus 100. The input/output interface 105 and/or the peripheral devices may be intelligent devices with their own memory for instructions and data.

In the example shown in FIG. 2, the peripheral devices that communicate with the controller are one or more displays 106, user interfaces 107, a card and/or ticket reader 108, a printer 109, a bill acceptor and/or coin input mechanism 110 and a coin output mechanism 111. One or more of the displays 106 may include a touch screen 106A, forming part of the user interface 107. Additional devices may be included as part of the gaming apparatus 100, or devices omitted as required for a specific implementation.

In addition, the gaming apparatus 100 may include a communications interface, for example a network card 112. The network card, may for example, send status information, accounting information or other information to a central controller, server or database and receive data or commands from a the central controller, server or database. The game controller 101 may also include a random number generator 113, which generates a series of random numbers that determine the outcome of a series of random game events played as part of a game on the gaming apparatus 100. As explained in more detail in relation to FIG. 4, the computational device 102 may include two or more controllers or processors, which may be local or remote from each other and the displays 106.

Figure 3:
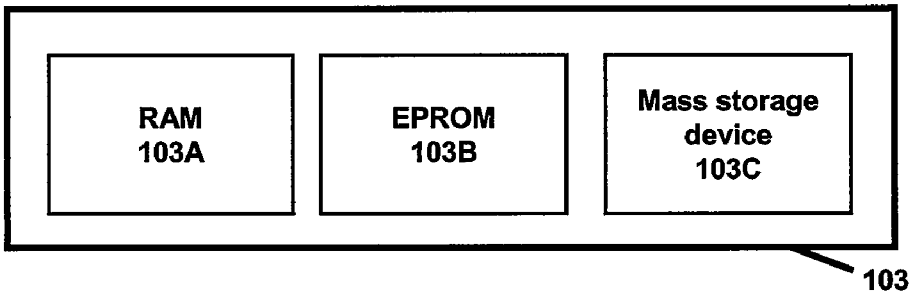
FIG. 3: shows a block diagram of components of the memory of the gaming apparatus represented in FIG. 2.

FIG. 3 shows an exemplary block diagram of the main components of the memory 103. The RAM 103A typically temporarily holds program files for execution by the computational controller 102 and related data. The EPROM 103B may hold be a boot ROM device and/or may contain some system or game related code. The mass storage device 103C is typically used to store game programs, the integrity of which may be verified and/or authenticated by the computational controller 102 using protected code from the EPROM 103B or elsewhere.

Figure 4:
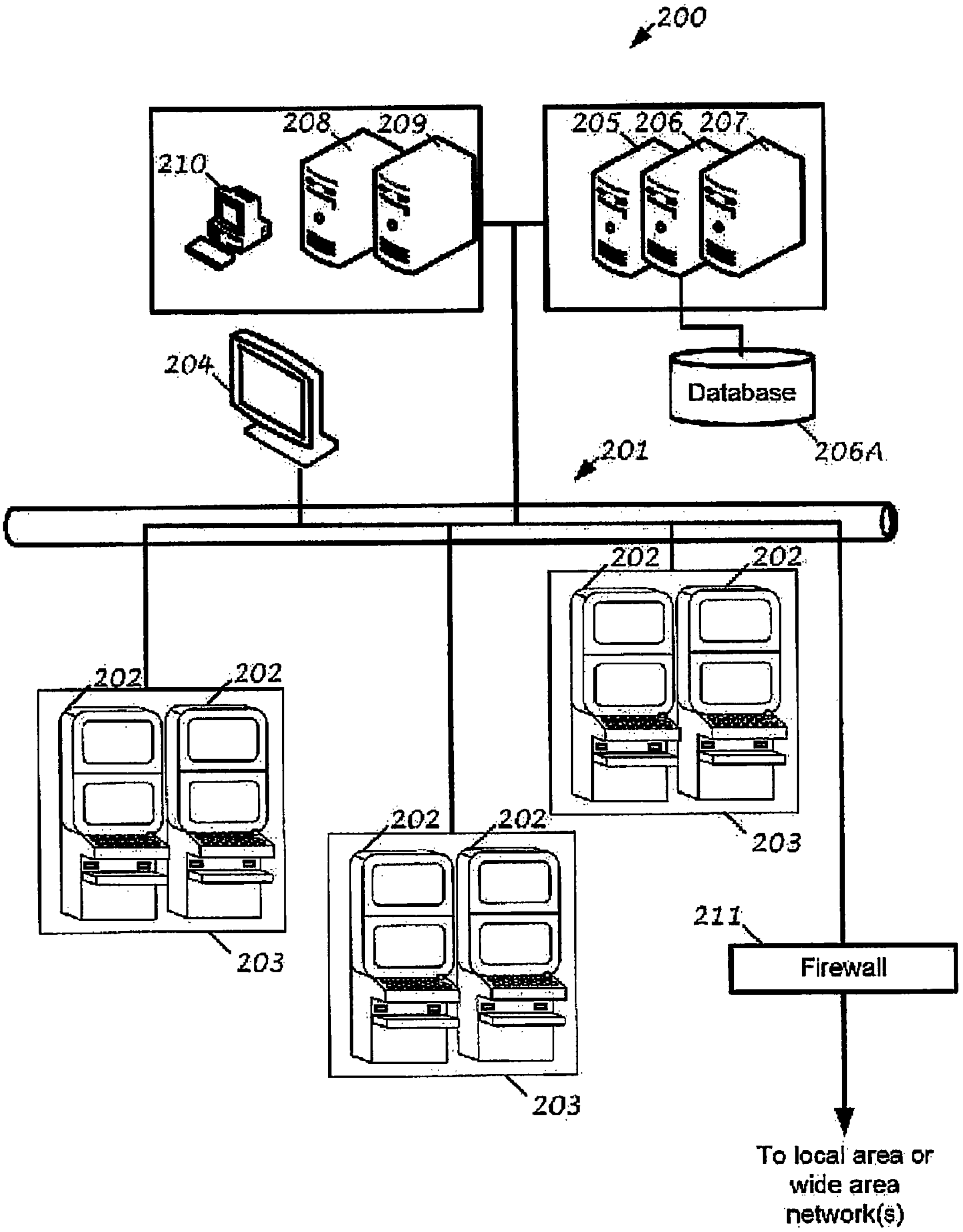
FIG. 4: shows diagrammatically, a network gaming system suitable for implementing certain embodiments of the present invention.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming apparatus 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

Servers may also be connected to the network 201. For example, a game server 205 may generate game outcomes for games played on the gaming devices 202, a database management server 206 may manage the storage of game programs and associated data for downloading or access by the gaming devices 202 in a database 206A, and a jackpot server 207 may control one or more jackpots associated with the gaming devices 202.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network.

The gaming system 200 may communicate with other gaming systems, other local networks, for example a corporate network and/or a wide area network such as the Internet through a firewall 211.

Figure 5:
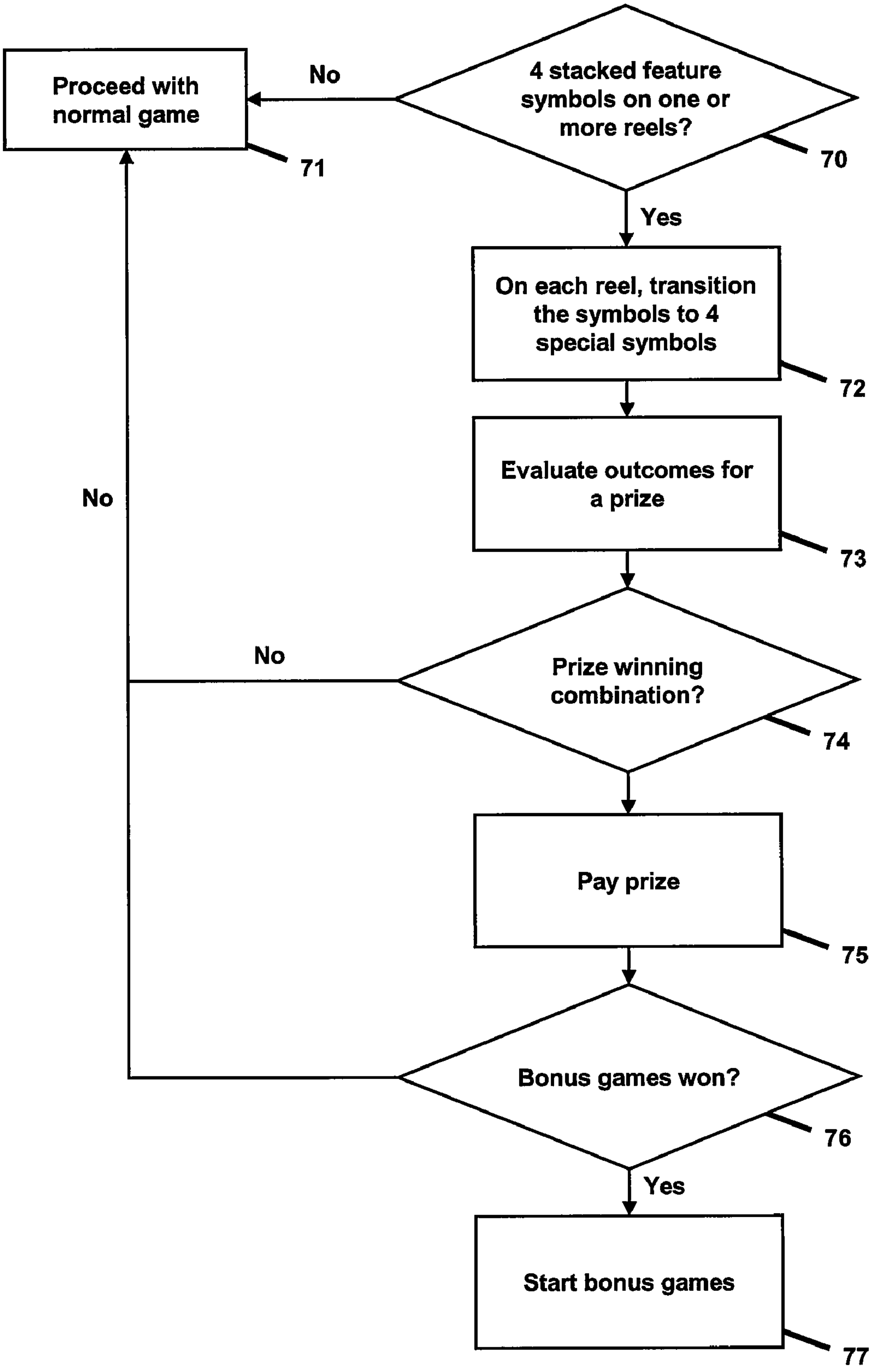
FIG. 5: shows a flow chart of a game process according to one embodiment of the present invention.

FIG. 5 shows a game process to be implemented by the game controller 101 in accordance with an embodiment of the present invention. The game controller 101 causes play of a game 16, which is a spinning reel game that has five reels, each of which display four symbols. The reels are defined so that at least one reel has four adjacent feature symbols. In certain embodiments, all of the reels have four adjacent feature symbols.

During play of the game 16, the game controller 101 evaluates whether four feature symbols have been spun up on a reel (step 70). If not, normal game play continues (step 71) and the outcomes defined by the symbols spun up on the reels and that have been bought by the player for that game play are evaluated for a winning combination and an award paid for any winning combination in a bought outcome.

If four feature symbols have been spun up on a reel, then each symbol is transitioned to a special symbol (step 72). As explained in more detail herein below, a special symbol is one having enhanced play characteristics in comparison to other symbols in the game 16. The outcomes defined by the symbols that have been spun up are then evaluated for winning combinations (step 73). If no winning combinations have resulted from the game play, then the game controller 101 causes the game 16 to proceed with normal game play (step 71), allowing a player to play again, purchasing the same or different outcomes from the possible outcomes in the game 16, or to cash out/quit.

If at least one winning combination has resulted from the game play, then game controller 101 causes the award of an award (step 75). This may be the awarding of a prize such as the incrementing of a win meter or locking of the machine to allow a prize to be paid manually by an attendant and/or the awarding of bonus games. Other awards may be awarded if required as part of the game 16, the awards generally being determined by looking up a pay table maintained by the game controller 101 or a prize value maintained remote of the game controller 101, for example by the jackpot server 207. One of the entries in the pay table may be an award of bonus games.

If bonus games are awarded, then play of the bonus games may be commenced automatically (steps 76 and 77). Otherwise, normal game play may resume (steps 76 and 71). The bonus games may be free games, in which no additional wager is required by the player to play the bonus games, or bought games, in which the player must continue to place a wager to play each bonus game.

The spinning up of four feature symbols may be associated with one or more awards regardless of whether any outcome in the game defines a winning combination. The awards may include a prize, for example an increment of a win meter and/or the award of bonus games.

Figure 6:
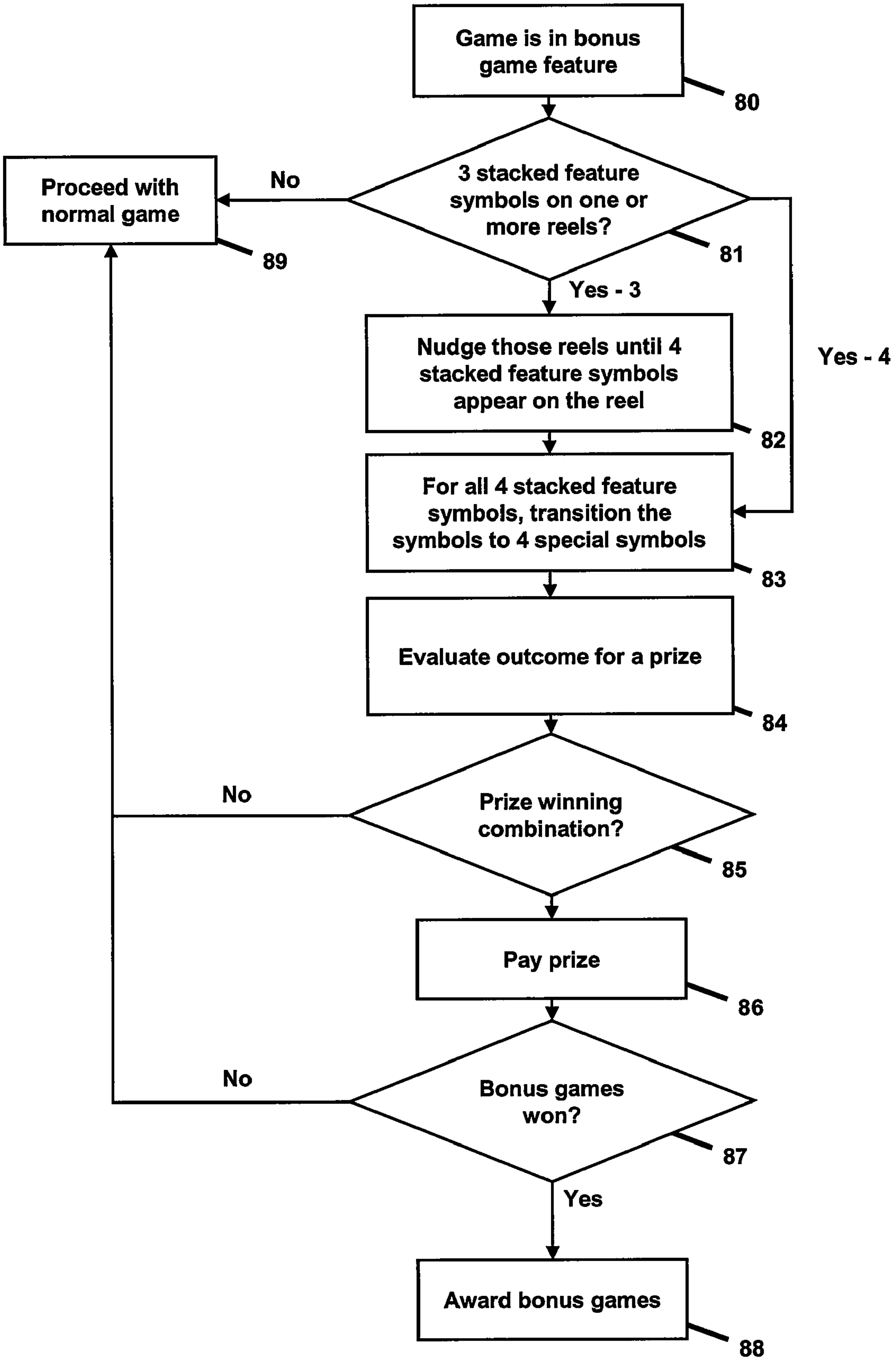
FIG. 6: shows a flow chart of a game process according to another embodiment of the present invention, which may be implemented as a feature game to the game process shown in FIG. 5.

FIG. 6 shows a flow chart of a process implemented by the game controller 101 following the award of bonus games. The bonus games may need to be played immediately following their award, or could be retained for future play. FIG. 6 shows an embodiment in which the bonus games are free games.

The process starts at step 80, when the game controller 101 enters the feature game, which is one or more bonus games, each bonus game being a play of a spinning reel game, which may have the same format as the base game. Again, one or more reels have four or more adjacent stacked feature symbols that can be spun up on a reel.

After a game play in which the reels have been spun, the game controller 101 evaluates whether three or four stacked feature symbols have been spun up on a reel (step 81). If three stacked feature symbols have been spun up, then the process proceeds to step 82 and the reels are nudged one symbol position so that four stacked feature symbols appear on the reel. Next, the four feature symbols are changed into four special symbols (step 83). This may be achieved by an animation of the symbol, which may be a simple switch or a more complex representation of the change. If four feature symbols were spun up originally, the process proceeds directly from step 81 to step 83.

Steps 84 to 88 and 89 are completed substantially in the same manner as steps 73 to 77 and 71 of FIG. 5 respectively and therefore these steps will not be explained in detail. However, the prizes paid in step 86 may optionally be from an enhanced pay table in comparison to the pay table used to determine the prizes paid in step 74. Also, the awarding of the bonus games in step 88 may be either a retrigger of the series of bonus games, or a second set of bonus games with further enhanced play characteristics or at least different enhanced play characteristics may be provided.

The process of FIG. 6 could be used for a base game instead of a bonus game, except that the games would not be free games, for example.

Figure 7:
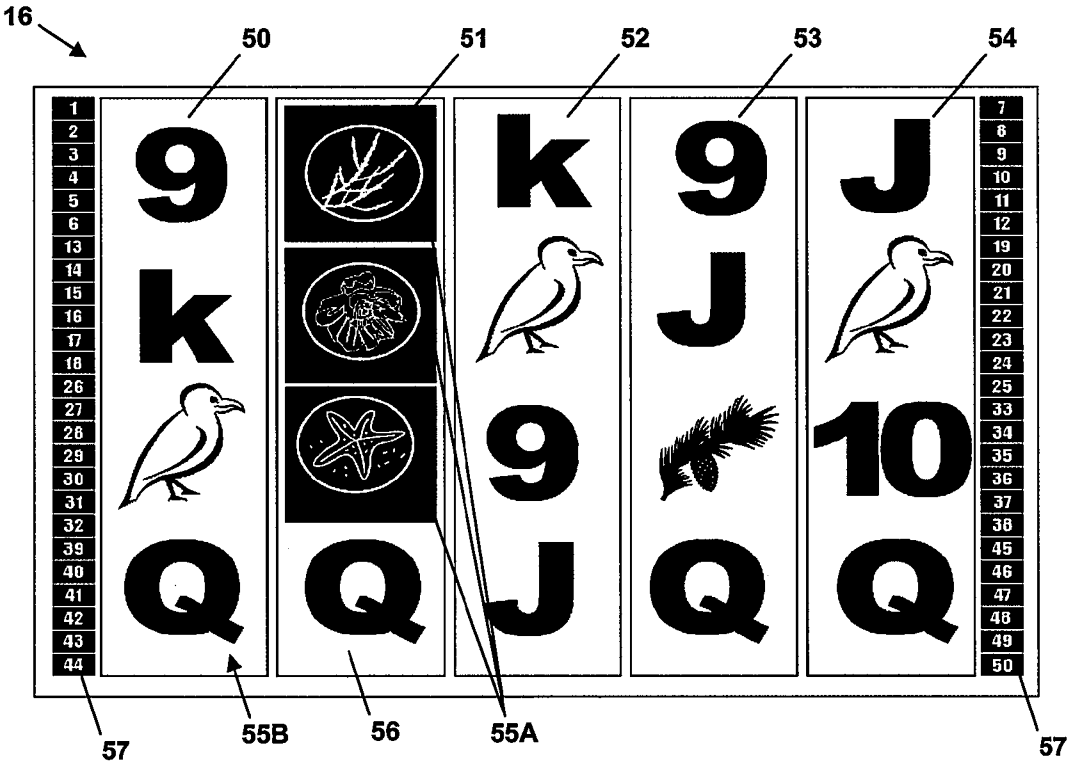
FIGS. 7 to 9: show a sequence of game screen displays according to one embodiment of the present invention.
Figure 8:
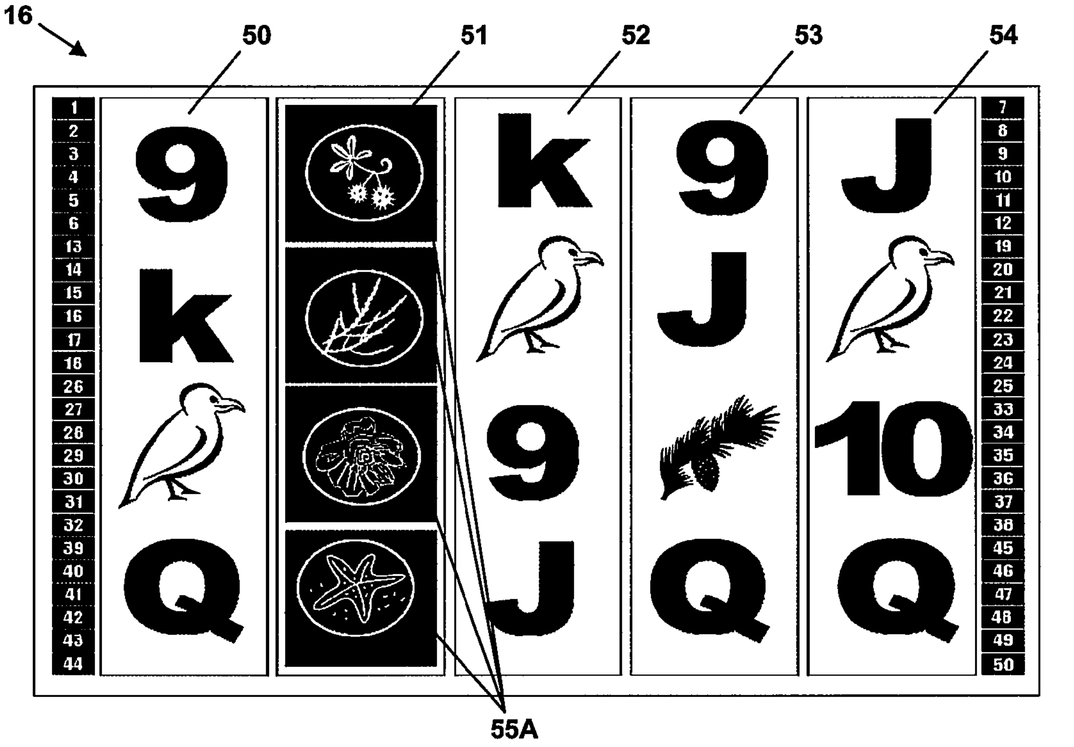
Figure 9:
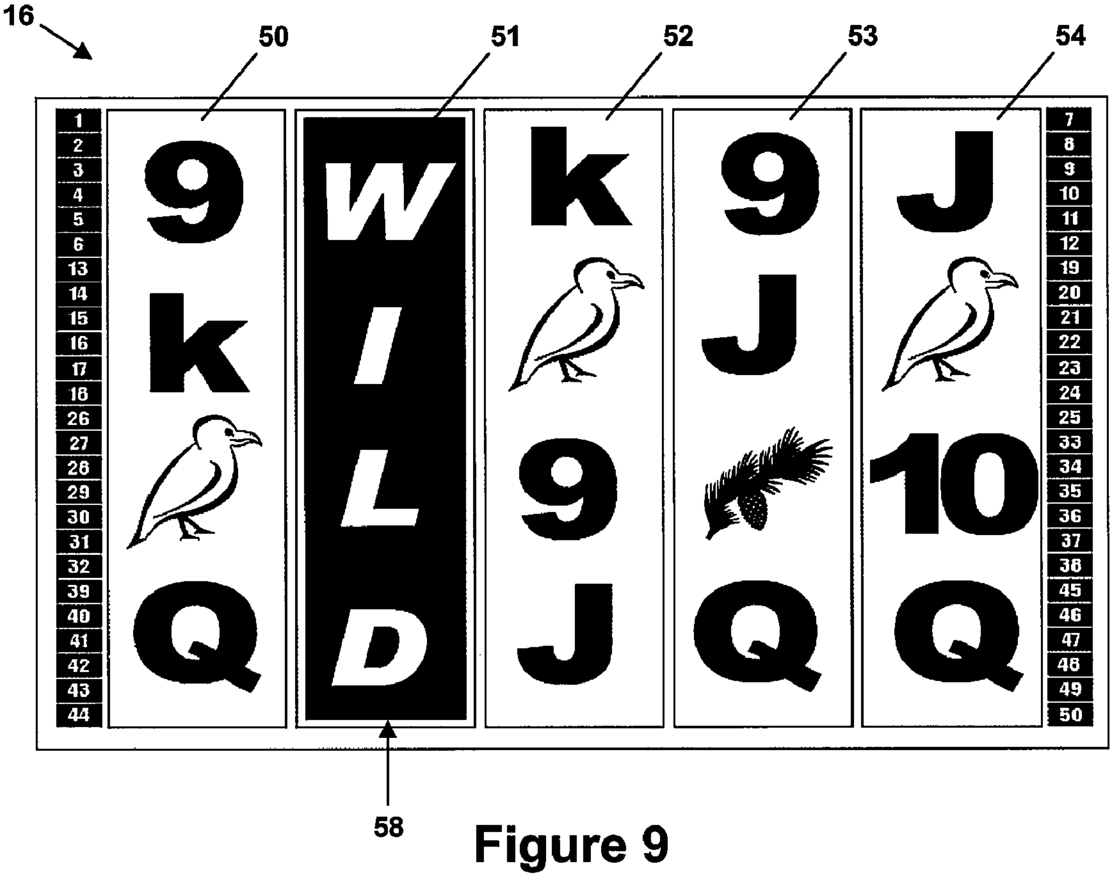

Referring now to FIGS. 7 to 9, a series of three game screens of a game 16 are shown, showing a progression of a game according to an embodiment of the present invention. The game screens are consistent with the process shown in FIG. 6 and therefore may be displayed as part of a feature game of a base game. The game is a spinning reel game that has five spinning reels 50-54, each of which display four symbols 55 (one only indicated in FIG. 5). The spinning reels therefore define a rectangular array of four rows by five columns. In alternative versions of this embodiment of the present invention, the array may have three or five or rows and two, three, four or six or more columns.

There are at least two different types of symbols 55 in the game 16, a feature symbol 55A and other symbols 55B (one only indicated in FIG. 5). The feature symbols 55A are displayed so as to be distinguishable from the other symbols 55B. In the accompanying drawings the feature symbols 55A are displayed with a filled in carrier portion 56 of the reel, whereas the carrier portion 56 of the other symbols 55B are plain.

At least one of the reels 50-55 have four feature symbols 55A located adjacent to each other. In FIG. 5 three adjacent feature symbols 55A have been spun up on the reel 51. This causes a "nudge" to occur, and the reel 51 moves down one symbol position, in which case the "Q" symbol is moved off the array and a feature symbol is moved onto the array, resulting n the game screen display shown in FIG. 6. The other reels 50, 52-54 remain in the same position.

In FIG. 6, the reel 51 now displays four feature symbols 55A and the feature symbols 55A therefore occupy the entire column. Once the display of the "nudge" has been completed, the feature symbols are then converted to special symbols. Special symbols are symbols that have an enhanced play characteristic in comparison to the other symbols. In the example shown in the drawings the feature symbols are converted to WILD symbols, which substitute for other symbols to potentially form one or more winning outcomes.

FIG. 7 shows the game screen after the feature symbols have been converted to WILD symbols 58. In the embodiment shown, each WILD symbol 58 is allocated one letter from the word "wild" so that the word "WILD" is displayed down the spinning reel 51. These WILD symbols 58 then substitute for the most favourable other symbol when forming the outcomes of the game. In this embodiment, the game 16 is a spinning reel game in which a player may wager on up to fifty outcomes, the outcomes formed by pay lines through the array and indicated by pay line indicators 57.

It is possible to nudge off the array a symbol that formed part of a winning combination. For example, if the combination of symbols across the lowest row in the array of {Q, Q, J, Q, Q} was a winning combination because it had a pair of "Q" symbols when evaluated from left to right, then the removal of the "Q" from the spinning reel 51 may eliminate this winning combination. However, the symbol is replaced with a special symbol and in the preferred embodiment the special symbol has characteristics that mean that any previous winning outcome remains a winning outcome of at least equal value.

Therefore, when forming the outcomes in FIG. 6 the WILD symbol 58A is deemed to be a "Q" symbol to form a pair of "Q" symbols. In addition, the WILD symbol 58A may form one or more other winning outcomes when combined with other symbols from the reel 50 and/or with other symbols from reels 52-54. Accordingly, the player wins at least the same prize as before the "nudge" process and has the potential to win additional awards.

The feature symbols may convert to special symbols other than WILD symbols. Other special symbols that could be used include scatter symbols, which are symbols that when displayed pay a prize no matter where they are displayed in the array, multiplying symbols, which multiply an existing prize by a multiplier, or bonus symbols, which trigger a bonus or feature game. If the special symbol is a bonus symbol, the award from the base game may be awarded in addition to entering the bonus game, which may be important to avoid the potential for dissatisfaction with the bonus game if there is potential to win a smaller award than the award that would have been awarded from the base game if the nudge operation (or other symbol replacement operation) had not occurred.

Therefore, a game of one embodiment of the present invention may have a base game and a feature game in the form of one or more bonus games. Both games may have adjacent feature symbols on one or more reels. However, the feature game is preferably modified relative to the base game to provide an increased return to player.

This modification may be achieved by allowing the reels to be "nudged" by a single symbol position as described herein. However, alternatives may be used, for example by allowing "nudging" to two or more symbol positions in the feature game, by allowing conversion of a row of feature symbols into special symbols instead of, or in addition to conversion of a column, by providing more reels with adjacent feature symbols, by providing a longer chain of feature symbols on the reels or providing multiple occurrences of adjacent feature symbols on a reel. These methods, which represent a modification of the circumstances under which special symbols are formed, may allow the player to become familiar with the feature game and reminded of the feature game through play of the base game, while maintaining a valuable distinction with the feature game. However, other methods of distinguishing the feature game may be used in addition to these methods or instead of these methods, including modifying the awards payable for certain combinations, modifying the reels, or otherwise.

In an alternative embodiment, the game may operate so that if two or more feature symbols occur in the same row in an array defined by the spinning reels, then either the entire row is converted to special symbols or all the symbols between two instances of the feature symbols, if any, are converted to special symbols, preferably by first being converted to feature symbols. The reels may also have stacked feature symbols to enable the completion of a reel with special symbols. Because spinning reel games generally have pay lines that extend across the array, in this embodiment there is potential for an entire pay line to be formed by special symbols.

In a further alternative embodiment, the feature symbols on the reels may be spaced apart and if two special symbols are spun up on a reel, then the symbols between the two instances of feature symbols may be converted to special symbols, again preferably by first being converted to feature symbols.

In a further alternative embodiment, the feature symbols may not need to occur in the array of symbols in any particular relationship. Instead, a threshold number of feature symbols may be required and if that threshold is met or exceeded, then the feature symbols may be converted to special symbols. Other symbols may also be converted to special symbols in addition to the feature symbols or instead of the feature symbols, the determination of what other symbols are converted depending on the rules of the game. For example a particular column may be converted to special symbols when the threshold number of feature symbols is met or exceeded. Alternatively or in addition, the symbols, if any, between two special symbols in a row and/or column may be converted to special symbols.

All of these three alternative embodiments of the invention may be applied to games other than spinning reel games. For example, they may be used in a card style game where a plurality of cards are dealt in one or more rows or otherwise dealt in an array.

Where the alternative embodiments are spinning reel games, an ability to "nudge" a reel may also be provided in these two alternative embodiments, the nudge in the first alternative embodiment used to align two feature symbols located in adjacent rows and the nudge in the second and third alternatives used to reveal a feature symbol that is one symbol position out of the displayed array. In the third alternative, a nudge may align two feature symbols so as to cause the conversion of more other symbols to special symbols.

When one or more feature symbols are displayed, but none of the criteria (or criterion if there is only one) are met, then the feature symbol may behave like other symbols. The pay table of the game may define an award if a particular combination of feature symbols occurs, for example two or three feature symbols on a pay line in a spinning reel game. Alternatively, the feature symbols that are not converted to special symbols may not otherwise contribute to a winning combination.

Those skilled in the relevant arts will appreciate from the foregoing description that the invention will also have application to spinning reel games and where appropriate other styles of game that define less or more than five columns and to games that display more or less than four rows of symbol positions.

While the foregoing description has been provided by way of example of the preferred embodiments of the present invention as presently contemplated, which utilise gaming apparatus and machines, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A method for use with a gaming machine having a game controller and a display that is arranged to present a plurality of distinct spinning reels coming to a stopped position on the display, each of the spinning reels comprising a plurality of symbols and wherein at least a first of the spinning reels comprising a plurality of adjacent feature symbols, there being a total m number of the adjacent feature symbols, the method comprising the steps of:

presenting via a display a plurality of distinct spinning reels coming to a stopped position on the display to display a plurality of symbols;

determining by the game controller whether the first of the spinning reels is displaying at least one feature symbol at the stopped position on the display;

determining by the game controller whether one of a plurality of game criteria has been satisfied, wherein the plurality of the game criteria comprises:

(1) the first of the spinning reels is displaying m−1 of the adjacent feature symbols on the display at the stopped position; and (2) the first of the spinning reels is displaying m of the adjacent feature symbols on the display at the stopped position;

in response to determining that the first of the spinning reels is displaying m−1 of the adjacent feature symbols on the display at the stopped position, moving the first of the spinning reels such that m of the adjacent feature symbols are displayed on the display at the stopped position; and in response to the first of the spinning reels displaying m of the adjacent feature symbols on the display at the stopped position, replacing by the game controller each of the m adjacent feature symbols with a special symbol.

2. A method according to claim 1 wherein the method further comprises replacing one or more symbols other than a feature symbol with a special symbol after it has been determined whether one of the plurality of game criteria has been satisfied.

3. A method according to claim 2 wherein the step of replacing one or more symbols other than a feature symbol may be performed based on the symbol which is to be replaced having a predefined location relative to the feature symbols.

4. A method according to claim 1 wherein the gaming machine provides a spinning reel game that defines outcomes by a plurality of pay lines that extend across the spinning reels.

5. A method according to claim 1 and further comprising evaluating a plurality of outcomes based on the symbols displayed at the stopped position for determining a winning combination.

6. A method according to claim 1 wherein the special symbols provide sufficiently enhanced play characteristics so as to provide an increased payout regardless of which other symbols they replaced.

7. A method of determining a plurality of outcomes in a spinning reel gaming machine having a game controller and a display for displaying a plurality of spinning reels, at least one of the reels having at least three adjacent stacked feature symbols, the method comprising:

presenting by a game controller on a display a plurality of symbols as an array of symbols, including rotating each reel so that each reel presents at least three symbols in the array;

evaluating by said game controller whether two or more of at least three adjacent stacked feature symbols are displayed in the array on the same reel and if so converting the two or more feature symbols and all the other symbols on the same reel to special symbols, wherein a special symbol has an enhanced play characteristic in comparison to others of said plurality symbols;

evaluating the array of symbols for a winning combination; and awarding an award if one or more winning combinations exists; and wherein the step of converting the two or more feature symbols and all the other symbols on the same reel to special symbols comprises:

(1) nudging the said one reel, said nudging including rotating the said one reel by at least one symbol position to change the array so that at least one other symbol is rotated out of the array and at least one said adjacent stacked feature symbol is rotated into the array, and (2) thereafter, transforming each of the feature symbols on said one reel into special symbols.

8. A method according to claim 7 wherein the step of nudging said one reel only occurs in a situation where there is only one symbol on said one a reel that is not a feature symbol.

9. A method according to claim 7 wherein the spinning reel gaming machine is a video reel game having a video display device.

10. A method according to claim 7 wherein the said one of the reels having at least three adjacent stacked feature symbols also has at least a number of adjacent stacked feature symbols equal to the number of rows in the array.

11. A method according to claim 7 wherein the step of evaluating includes evaluating the array of symbols for a winning combination of symbols that includes at least one special symbol.

12. A method of determining a plurality of outcomes in a gaming machine having a game controller and a display, the method comprising:

selecting a plurality of symbols by a game controller and forming on a display an array of symbols having at least three columns;

evaluating by the game controller whether two or more adjacent feature symbols have been selected in the same row and if so converting the two or more adjacent feature symbols and all the other symbols in the same row to special symbols, wherein a special symbol has an enhanced play characteristic in comparison to others of said plurality symbols;

evaluating by the game controller the array of symbols for a winning combination;

if a winning combination exists, awarding an award; and wherein the step of converting the two or more adjacent feature symbols and all the other symbols in the same row to special symbols comprises:

(1) moving the said one row by at least one position to change the array so that at least one other symbol is moved out of the array and at least one said feature symbol is moved into the array adjacent to the other adjacent feature symbols, and (2) thereafter transforming the feature symbols in said one row into special symbols.

13. A method according to claim 12 wherein the gaming machine is a spinning reel gaming machine, with each reel forming one of said columns and displaying a plurality of symbols to thereby define a plurality or rows, and with at least two of the reels including at least one feature symbol.

* * * * *